Nov. 21, 1967 A. INGOLD ETAL 3,353,262
MANUFACTURE OF ELECTRIC IGNITORS FOR DETONATORS
Filed April 24, 1964
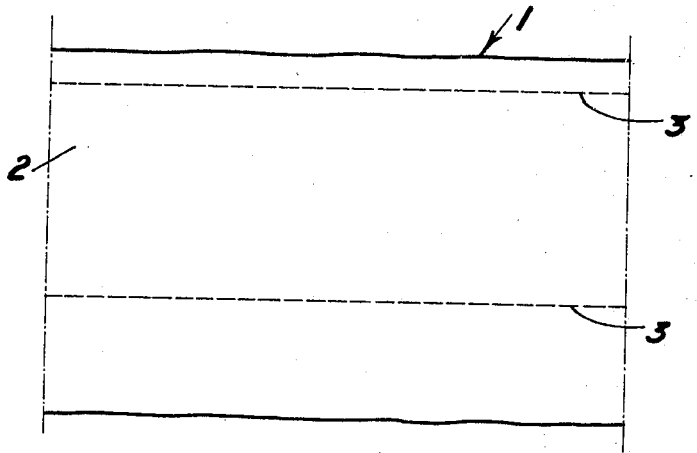
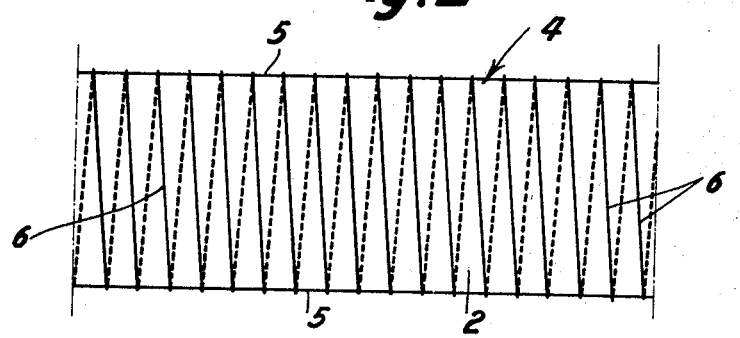
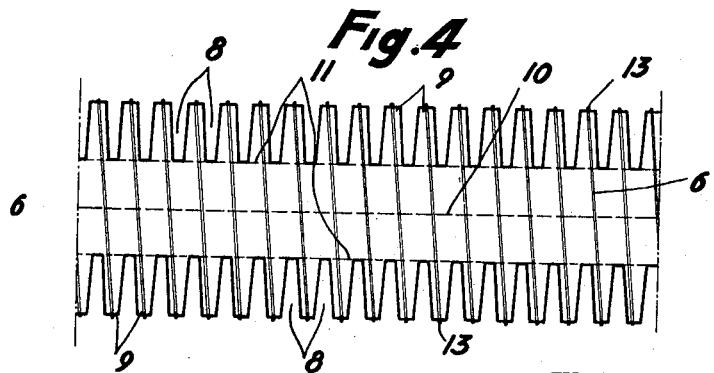
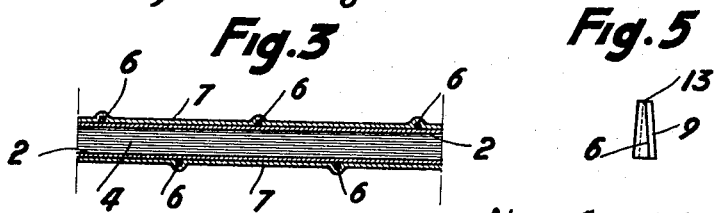
Alain Ingold and Jean Raynal
By Littlepage & Quaintance
Their Attys.

United States Patent Office 3,353,262
Patented Nov. 21, 1967

3,353,262
MANUFACTURE OF ELECTRIC IGNITORS
FOR DETONATORS
Alain Ingold and Jean Raynal, Hery, Yonne, France, assignors to Etablissement Davey Bickford Smith & Cie Societe Anonyme Francaise, Rouen, Seine Maritime, France, a corporation of France
Filed Apr. 24, 1964, Ser. No. 362,338
Claims priority, application France, May 9, 1963, 934,246
5 Claims. (Cl. 29—623)

The present invention relates to electric ignitors for blasting cartridge detonators.

In such devices, ignition is effected by temperature increase of a resistant metal wire of a very small diameter, through which an electric current is propagated during a very short time.

According to one known method, ignitors have been hitherto manufactured by causing thin metal foils to adhere on both sides of a cardboard sheet, and welding a very thin metal wire on the two metal foils so as to form a resistant bridge across one edge of the said cardboard sheet.

According to another known method, the thin metal wire is crimped or welded across two metal rods which may form the end portions of the electric fuse conductor.

These known methods have however various drawbacks, requiring, in particular, a careful handling of the setting, welding or crimping of the thin metal wire, the diameter of which may be as small as 0.03 mm.; in addition, and in order to provide a good contact between the wire and the metal foils, the portions to be assembled must be very carefully cleaned. It is moreover difficult to provide a constant ohmic value for the resistance formed by the said metal foils or rods and the series connected metal wire during the welding operation, since the etching product necessarily applied before depositing the solder drop tends to react chemically, with time, with the metal of the foils or rods, resulting in a variation of said ohmic value.

It is therefore an object of the present invention to provide a method whereby the metal wire or filament and the metal foils or rods are perfectly and simply assembled, under maximum efficiency. Another object of the invention is to provide ignitors in which the ohmic value of the resistance is substantially constant from one ignitor to the other.

The method according to the invention comprises the steps of forming a conductive metal or alloy coating adhering to both sides of a thin strip of dielectric material, while maintaining the side edges of the strip free from any metallization; winding around said metallized strip, a fine metal wire as a spiral of uniform pitch; depositing a further metal coating on both sides of the strip at least on the major portion thereof, with preventing the metallization of the side edges, and cutting in said strip, along at least one of its edges and between the turns of the helix formed by the metal wire, a series of uniformly spaced slots substantially perpendicular to the longitudinal axis of the strip, so as to impart to the latter the shape of a comb, which can be afterwards cut off to form individual ignitors.

It is generally convenient to proceed from a sheet of a dielectric material, such as cardboard of suitable thickness and quality, or any other material of the required rigidity and dielectric qualities, to metallize both sides of this sheet, and finally to cut the same into strips over which the metal wire is then wound.

According to a preferred embodiment of the invention, the thin strip, metallized on both its faces, provides a width at least equal to twice the desired length of the ignitor to be produced, the helix pitch of the metal wire wound on said strip being substantially equal to the desired width of the base of the ignitor, the slots being formed along the two edges of the strip which is thereafter separated into two parts along its longitudinal median axis, before being divided into individual ignitors; for instance, by cutting off each side along a line passing through the bottom of the slots, whereby individual fuse heads are directly obtained, the dimensions of which correspond to the plane portions between the slots.

It will however be appreciated that it is also possible to use a strip of a width equal at least to the desired length of the ignitors to be produced, the slots being then formed merely along one edge of the strip.

The strips or foils from which strips are cut out can be metallized by any known means, such as by gun spraying, vacuum metallization, cathode spraying, chemical reduction and the like. The metal or alloy deposited may be for instance copper, zinc, aluminium or any other conductive metal or alloy. The thickness of the deposit is fixed by taking into account the nature of the metal or alloy and the required electrical or mechanical qualities of the metal layer, which layer is intended to provide the mechanical resistance of the ignitor by reinforcing that of the dielectric support.

A non-limiting example of the invention is described herebelow, with reference to the appended drawings, wherein:

FIG. 1 is a plan view of a portion of a sheet wherein the initial strips are cut out.

FIG. 2 is a similar view, showing the metallized sheet on which the wire conductor is wound in a spiral.

FIG. 3 is an axial cross-section, at an enlarged scale, of said strip after the second metallization has been deposited.

FIG. 4 is a plan view of the "comb" configuration finally obtained.

FIG. 5 is a plan view of an individual ignitor cut out in such a comb.

According to the invention, a cardboard sheet 1 of a thickness of about 0.5 mm. is provided on both sides, by a metallization process such for instance by gun spraying, with a zinc coating or layer 2 (FIG. 1 and 2) of a thickness of about 0.05 mm.; afterwards, said sheet is cut off along the dashed line 3 to form strips 4, which are metallized on both their faces, but have their side edges 5 free from any metallization.

On the strip thus formed, there is helically wound (FIG. 2) a metal wire 6 of a diameter of 0.03 mm., with a helix pitch substantially equal to the width of the base of each individual ignitor to be finally obtained. A further zinc layer 7 is deposited on both sides of the strip, thus embedding the filament 6 over its total thickness, while the side edges 5 of the strip are protected so as to not receive any metallization. Such protection may be provided either by means of protective screens or by a convenient choice of the angle of spraying of the metal spraying onto both sides of the strip. Slots such as 8 are then cut out in the strip, along both its edges and between the turns of wire 6, whereby teeth portions 9 similar to that of a comb are reserved between the successive slots, said wire 6 being positioned on said teeth portions, and the strip is thereafter cut off longitudinally along its median axis 10 (dashed lines).

The two "comb" structures thus obtained can be supplied to the plants where the following operations take place: soakings, cuttings, along the dotted lines 11 of FIGURE 4. After cutting, an individual ignitor as shown in FIGURE 5 is finally obtained, which consists of a comb tooth 9, the portion 13 of the wire 6 passing around the end of said comb tooth being bare and providing the conductor the elevation of the temperature of which, under the effect of the current fed to the ignitor through the conductors also soldered on both faces thereof, will result in the ignition of the detonator.

As above mentioned, it is also possible, instead of using initial strips such as 4, to employ starting strips of half a width, the slots 8 are then formed exclusively along one side 5 of the strip, and the final comb thus forms half of that shown in FIGURE 4, as the winding pitch of wire 6 has been suitably adapted.

Furthermore, instead of cutting the ignitors along lines such as 11, these ignitors may receive a greater length, for instance by cutting the "combs" along lines perpendicular to their longitudinal axes and passing through the center of each slot.

What we claim is:

1. A process for the preparation of electrical ignitors for detonators comprising forming an adherent electrically conductive metallic coating on both faces of a thin strip of dielectric material, providing at least one side edge of said dielectric strip free from any metallization, winding around the coated strip and over said at least one edge a thin and narrow metallic conductor in the form of a helix of uniform pitch depositing a second conductive metallic coating over a major portion of the width of both faces of said strip including parts of the helically wound conductor while preventing the metallizing of said at least one side edge, cutting slots out of said strip between the turns of said helix along the at least one edge of the strip to provide outwardly projecting portions of the strip having the appearance of the teeth of a comb, and thereafter cutting off said outwardly projecting portions to provide individual ignitors.

2. The process of claim 1, wherein said at least one side edge of said dielectric material free from any metallization is provided by first coating both faces of the dielectric strip and then cutting a longitudinal strip from at least one edge thereof.

3. The process of claim 1, wherein the width of the faces of the dielectric strip metallized on both faces is at least twice the desired length of the individual ignitors, the helix has a pitch equal to the desired width of the individual ignitors, and the slots are cut out along the two side edges of the strip.

4. The process of claim 1, wherein the width of the dielectric strip metallized on both sides is at least equal the desired length of the individual ignitors and the slots are cut out of one edge of the strip only.

5. A strip of material adapted for the formation of a plurality of individual ignitors for deonators comprising an elongated thin strip of dielectric material having a first electrically conductive metallic coating over both faces thereof constituting an undercoat and having at least one side edge free of metallization, a thin and narrow metallic conductor wound around said strip over said undercoat and said edge in the form of a helix of uniform pitch, and a second conductive metallic coating covering a major proportion of said undercoat and at least part of said narrow metallic conductor, said one side edge having slots therein between the turns of said helix to thereby simulate the teeth of a comb.

References Cited
UNITED STATES PATENTS

| | | | |
|---|---|---|---|
| 720,073 | 2/1903 | Schmitt et al. | 102—28 |
| 1,407,157 | 2/1922 | Hessen. | |
| 2,418,460 | 4/1947 | Buehler | 29—473.1 X |
| 2,506,229 | 5/1950 | Lowe et al. | 102—28 |
| 2,782,492 | 2/1957 | Frost | 102—28 X |
| 2,907,100 | 10/1959 | Linoblad | 29—155.5 |
| 2,983,032 | 5/1961 | Pearson et al. | 29—155.5 |

JOHN F. CAMPBELL, *Primary Examiner.*

J. M. ROMANCHIK, J. CLINE, *Assistant Examiner.*

UNITED STATES PATENT OFFICE

CERTIFICATE OF CORRECTION

Patent No. 3,353,262                          November 21, 1967

Alain Ingold et al.

It is hereby certified that error appears in the above numbered patent requiring correction and that the said Letters Patent should read as corrected below.

Column 3, line 22, for "pitch" read -- pitch, --; column 4, line 11, for "deonators" read -- detonators --.

Signed and sealed this 24th day of December 1968.

(SEAL)
Attest:

Edward M. Fletcher, Jr.

Attesting Officer

EDWARD J. BRENNER

Commissioner of Patents